April 13, 1954     G. C. NEWTON     2,675,462
ILLUMINATING MEANS FOR TELEVISION APPARATUS
Filed May 9, 1950
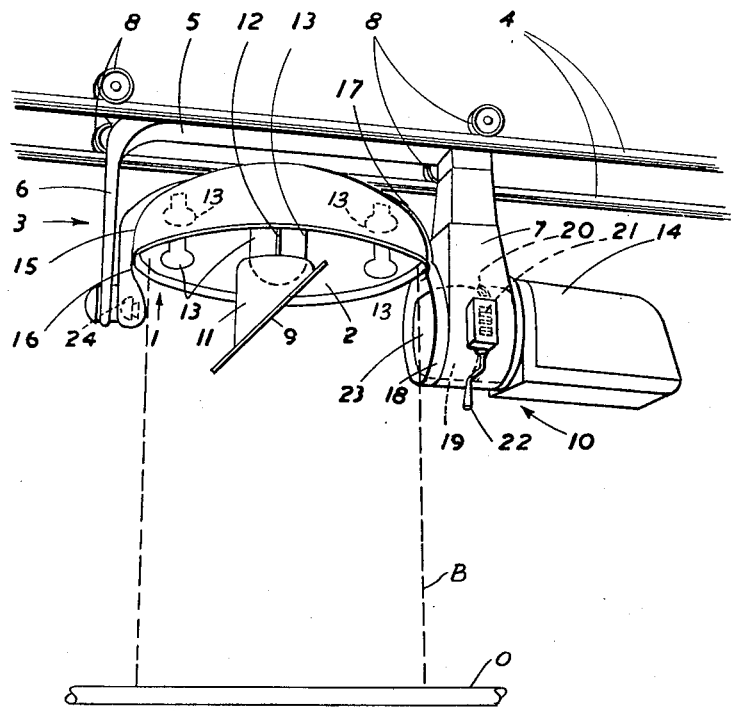
Inventor
GEORGE CHARLES NEWTON
By Ralph E. Atherton
Attorney Patented Apr. 13, 1954

2,675,462

UNITED STATES PATENT OFFICE 2,675,462

ILLUMINATING MEANS FOR TELEVISION APPARATUS

George Charles Newton, Anerley, London, England, assignor to Electric & Musical Industries Limited, Hayes, Middlesex, England, a British company Application May 9, 1950, Serial No. 160,892

Claims priority, application Great Britain May 10, 1949

3 Claims. (Cl. 240—2)

This invention relates to television apparatus.

The object of the present invention is to provide a television apparatus which is particularly suitable for televising objects which are illuminated by a source of illumination and in which it is desired to maintain the television camera in a fixed position with respect to the source of illumination. One application of such an apparatus is the televising of surgical operations in which the source of illumination is mounted above the operating table.

According to the present invention television apparatus is provided comprising a source of illumination adapted to project a beam of light on to the object to be televised, an inclined mirror disposed substantially in the centre of said source and arranged to direct light received from the object into a television camera mounted with its axis substantially at right angles to the axis of the beam of light projected from said source.

In order that the said invention may be clearly understood and readily carried into effect, it will now be more fully described with reference to the accompanying drawing which illustrates television apparatus in accordance with the invention designed for use in the televising of surgical operations.

In the drawing, the reference numeral 1 indicates a source of light which may comprise any of the well known forms of surgical illuminating lamps of the so-called shadowless type. In general, such lamps comprise a dome-shaped reflector 2 with one or a plurality of electric lamps 13 associated therewith and arranged to direct a beam of light B downwardly on to the operating table O. A type of lamp which is suitable is one known as a Scialytic lamp. The source of illumination 1 is supported in any suitable manner from a carriage 3 which is arranged to travel along parallel rails 4 mounted above the operating table. The carriage 3 generally comprises a U-shaped member 5 arranged with its limbs 6 and 7 depending and having at its upper end suitably grooved rollers 8 which are adapted to travel along the rails 4. Supported centrally from the source of illumination 1 is a mirror 9 disposed at approximately 45° with respect to the axis of the reflector 2, said mirror being arranged to direct light reflected from the operating table into a television camera 10 which is mounted with its axis substantially horizontal, i. e. at right angles to the axis of the light beam. The mirror 9 is carried at the end of a sleeve 11 which is suspended by bolts 12 from the reflector 2, the sleeve 11 surrounding the lower end of the center lamp 13. The television camera is arranged within a suitable housing 14 and the pick-up tube of the camera may be of the cathode potential stabilised type. Said housing also carries the usual equipment associated with television cameras, such as the so-called head amplifier, etc. The television camera 10 and the source of illumination 1 are coupled together so that the source 1 and the camera can be angularly moved simultaneously about a horizontal axis so that the beam of light can be directed to particular areas without necessitating any relative adjustment of the position of the camera with respect to the source 1. For this purpose the reflector 2 is supported on a U-shaped support 15 arranged between the aforesaid limbs 6 and 7, one arm 16 of the U-shaped support 15 being pivotally mounted on the limb 6 of said carriage, while the other arm 17 of said U-shaped support 15 is formed with a ring 18 which is secured to a sleeve 19 rotatably mounted in the limb 7 of said carriage. Said sleeve 19 also serves to support the television camera 10 and is associated with suitable means whereby the sleeve can be rotated about its axis, such rotation being imparted to the reflector and to the television camera simultaneously so that they are always maintained in predetermined relationship. To rotate said sleeve 19 the periphery is provided with suitable gear teeth 20 meshing with a worm 21 or the like which can be rotated by a handle 22. Said sleeve 19 at the end adjacent to the reflector 2 is provided with a suitable window 23 to protect the lenses of the camera.

The arm 16 of said U-shaped support which is pivoted to said carriage is constructed to house a microphone 24 as indicated whereby the surgeon can lecture to students viewing the operation on television receivers located at a remote point.

What I claim is:

1. Television apparatus comprising a supporting structure having a pair of spaced limbs, a source of illumination including a reflector mounted between the inner surfaces of said limbs to project a beam of light on to the object to be televised, a mirror carried by said structure and inclined to the axis of said beam and disposed substantially in the center of said reflector, and a television camera mounted on one of said limbs and projecting from the outer surface thereof and facing said mirror to receive light from said object via said mirror, said camera, reflector and mirror being mounted for angular movement about an axis extending transversely of said beam, the whole forming a unitary structure.

2. Television apparatus comprising a carriage, rails for supporting said carriage, means supporting said carriage on said rails for longitudinal movement along said rails, said carriage having a pair of spaced downwardly projecting limbs, a source of illumination including a reflector mounted between the inner surfaces of said limbs to project a beam of light on to the object to be televised, a mirror carried by said structure and inclined to the axis of said beam and disposed substantially in the center of said reflector, and a television camera mounted on one of said limbs and projecting from the outer surface thereof and facing said mirror to receive light from said object via said mirror, said carriage, said source of illumination including said reflector, said mirror and said camera forming a unitary structure movable as a whole along said rails.

3. Television apparatus comprising a carriage, rails for supporting said carriage, means supporting said carriage on said rails for longitudinal movement along said rails, said carriage having a pair of spaced downwardly projecting limbs, a source of illumination including a reflector, means mounting said reflector between said limbs for angular movement about an axis extending transversely of said limbs, a mirror carried by said reflector and inclined to the axis of said beam and disposed substantially in the center of said reflector, a television camera mounted on one of said limbs and projecting from the outer surface thereof and facing said mirror to receive light from said object via said mirror, means coupling said camera to said reflector for angular movement therewith, and means for imparting angular movement to said camera, reflector and mirror, said reflector, mirror and camera forming a unitary structure movable as a whole along said rails.

References Cited in the file of this patent

UNITED STATES PATENTS

| Number | Name | Date |
|---|---|---|
| 947,058 | Duncan | Jan. 18, 1910 |
| 1,842,855 | Bernard | Jan. 26, 1932 |
| 2,129,001 | Goehner | Sept. 6, 1938 |
| 2,243,788 | Benard | May 27, 1941 |
| 2,292,044 | Bucky | Aug. 4, 1944 |
| 2,399,577 | Simon et al. | Apr. 30, 1946 |